(12) United States Patent
Venter

(10) Patent No.: US 10,316,891 B2
(45) Date of Patent: Jun. 11, 2019

(54) DEVICE WITH A TORQUE-PROOF FIRST STRUCTURAL COMPONENT AND A SECOND STRUCTURAL COMPONENT THAT IS CONNECTED TO THE FIRST STRUCTURAL COMPONENT IN A ROTABLE MANNER AT LEAST IN CERTAIN AREAS

(71) Applicant: Rolls-Royce Deutschland Ltd & Co KG, Blankenfelde-Mahlow (DE)

(72) Inventor: Gideon Venter, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 15/819,752

(22) Filed: Nov. 21, 2017

(65) Prior Publication Data

US 2018/0142733 A1   May 24, 2018

(30) Foreign Application Priority Data

Nov. 23, 2016   (DE) .................. 10 2016 122 583

(51) Int. Cl.
  *F16H 57/04*   (2010.01)
  *F16C 33/66*   (2006.01)
  (Continued)

(52) U.S. Cl.
  CPC ............ *F16C 33/6681* (2013.01); *F02C 7/36* (2013.01); *F16C 19/362* (2013.01);
  (Continued)

(58) Field of Classification Search
  CPC .. F16C 33/743; F16C 33/748; F16C 2360/23; F16J 15/447; F16J 15/4472; F16H 57/0424; F16H 57/0427; F16H 57/0428
  See application file for complete search history.

(56) References Cited

U.S. PATENT DOCUMENTS 4,329,000 A   5/1982   Keske
4,389,052 A   6/1983   Shimizu et al.
(Continued)

FOREIGN PATENT DOCUMENTS

DE   3021349 A1   1/1981
DE   112010000875 T5   6/2013
(Continued)

OTHER PUBLICATIONS

European Search Report dated Mar. 21, 2018 from counterpart European App No. 17202520.7.
(Continued)

*Primary Examiner* — Phillip A Johnson
(74) *Attorney, Agent, or Firm* — Shuttleworth & Ingersoll, PLC; Timothy J. Klima

(57) ABSTRACT

A device with a torque-proof first structural component and second structural component that is connected to the first structural component in a rotatable manner at least in certain areas. Hydraulic fluid can be supplied to lubrication points via the first and second structural components. An interface between the structural components has first and second transition areas arranged at a distance from each other in axial extension of the structural components. During operation, a pressure is applied to the first transition area which is higher than a pressure applied to the second transition area. A sealing appliance is arranged in the area of the interface between the first and second transition areas, which includes a threaded area in an area of a surface of one of the first and second structural components facing towards a surface of the other of the first and second structural components.

15 Claims, 5 Drawing Sheets

(51) Int. Cl.
*F16C 19/36* (2006.01)
*F02C 7/36* (2006.01)
*F16H 57/08* (2006.01)
*F01D 25/16* (2006.01)
*F01D 25/18* (2006.01)

(52) U.S. Cl.
CPC ..... *F16H 57/0424* (2013.01); *F16H 57/0482* (2013.01); *F16H 57/08* (2013.01); *F01D 25/16* (2013.01); *F01D 25/18* (2013.01); *F05D 2240/53* (2013.01); *F05D 2260/40311* (2013.01); *F05D 2260/98* (2013.01); *F16C 2360/23* (2013.01)

(56) References Cited

U.S. PATENT DOCUMENTS

| | | | |
|---|---|---|---|
| 2003/0030225 A1* | 2/2003 | Uesugi | F16C 17/026 277/431 |
| 2010/0175377 A1 | 7/2010 | Hippen et al. | |
| 2012/0192570 A1 | 8/2012 | McCune et al. | |
| 2013/0241153 A1* | 9/2013 | Garrison | F01D 11/02 277/350 |
| 2014/0265145 A1* | 9/2014 | Copeland, III | F02C 7/28 277/405 |
| 2015/0184531 A1* | 7/2015 | Baptista | F01D 25/16 415/230 |
| 2016/0160993 A1 | 6/2016 | Venter | |
| 2016/0160994 A1 | 6/2016 | Venter | |

FOREIGN PATENT DOCUMENTS

| | | |
|---|---|---|
| DE | 102014117840 A1 | 6/2016 |
| EP | 3029357 A1 | 6/2016 |
| EP | 3029359 A1 | 6/2016 |

OTHER PUBLICATIONS

German Search Report dated Sep. 28, 2017 from counterpart German App No. 102016122583.5.

* cited by examiner

DEVICE WITH A TORQUE-PROOF FIRST STRUCTURAL COMPONENT AND A SECOND STRUCTURAL COMPONENT THAT IS CONNECTED TO THE FIRST STRUCTURAL COMPONENT IN A ROTABLE MANNER AT LEAST IN CERTAIN AREAS

This application claims priority to German Patent Application 102016122583.5 filed Nov. 23, 2016, the entirety of which is incorporated by reference herein.

The invention relates to a device with a torque-proof first structural component and a second structural component that is connected to the first structural component in a rotatable manner at least in certain areas as disclosed herein.

What is known from practice are devices that are embodied with a torque-proof first structural component and a second structural component that is connected to the first structural component in a rotatable manner at least in certain areas, in which hydraulic fluid can be guided to lubrication points via the first structural component and the second structural component. Such constructive arrangements for transferring hydraulic fluid between a torque-proof structural component and a second structural component that is connected to the former in a rotatable manner are for example required in planetary gears that are supplied with lubricating and cooling oil to the required extent via bearing units and tooth meshings.

Planetary gears are used in the field of turbomachines, such as aircraft gas turbines with a high bypass ratio, to obtain a rotational speed of a fan that is lower than a rotational speed of the low-pressure turbine, so that the fan as well as the low-pressure turbine can be operated in optimal operational ranges. The low-pressure turbine and the fan are coupled to each other for example via a reducing gear in planetary design, wherein epicyclic reduction gears with planetary carriers that are affixed at the housing or with a rotatable planetary carrier provide the desired reduction ratio while at the same time having a high power density.

In order to achieve the required reduction ratio in the area of a epicyclic gear or a planetary wheel set in a planetary carrier that is affixed at a housing, a compressor shaft of the low-pressure turbine is connected to a sun wheel of an epicyclic gear. The hollow wheel is in turn coupled to a fan shaft driving the fan. The reaction torques are introduced into the housing in the area of the static planetary carrier. If the hollow wheel is embodied in a torque-proof manner, a high input speed with at the same time low output speed of the planetary carrier is present in the area of the sun wheel.

With an epicyclic reduction gear with a rotating planetary carrier, in order to be able to [supply] lubrication points with hydraulic fluid to the desired extent in the area of the planetary wheel set, hydraulic fluid is transferred under pressure from a static or torque-proof housing structure into a rotating structure, such as for example the rotating planetary carrier. Then, tooth meshings of the planetary wheel set can be supplied with lubricating and cooling oil to the same extent as the bearing units of a main drive train of an engine.

In particular so-called high-speed planetary wheel sets have to be respectively supplied with a correspondingly large hydraulic fluid volume stream in order to be able to ensure sufficient lubrication and cooling of tooth meshings, and to be able to dissipate the heat losses that occur during operation to a corresponding degree. In contrast, lower hydraulic fluid pressures and larger hydraulic fluid volume streams are required for supplying lubrication and cooling oil in particular of slide bearing appliances of a main drive train. To be able to obtain the desired pressures and volume streams in the area of the rotating structural components, it is known to adjust the hydraulic fluid volume stream that is transferred between the structural components to the required pressures and volume streams by means of constructionally elaborate multi-stage sealing appliance downstream of the structural components.

To seal off a transition area between a torque-proof and a rotatable structural component against an environment, it is known from DE 10 2014 117 840 A1 to form a sealing appliance with a threaded area in the area of an interface between a torque-proof and a rotatable structural component.

In principle, the service life of sealing appliances in the area of oil feeds depends on the respectively present operation temperature, the circumferential speed of the rotating structural components and the pressure differences that are respectively applied to a sealing appliance. Here, high circumferential speeds and high supply pressures have a negative effect on the service life of a seal. A sealing effect that deteriorates in the course of the service life of an aircraft gas turbine results in a reduction in lubrication, which in turn makes damage in the area of a reducing gears and an undesired failure of the functionality of such a reducing gear more likely to occur.

In an embodiment of a gas turbine engine that is described in US 2012/0192570 A1, different areas of the gas turbine engine are to be cooled or lubricated with hydraulic fluid volume streams that can be provided through separate conduits, wherein the hydraulic fluid volume streams can be respectively transferred via separate flow paths between a torque-proof structural component and a rotatable structural component. In this manner, hydraulic fluid with a desired pressure and a desired volume stream can respectively be provided to every area to be cooled and lubricated.

A disadvantage of this embodiment is the undesirably large leakage between the torque-proof structural component and the rotatable structural component that is caused by the high pressures and volume streams present during operation in the area of the interface between the structural components. Here, a pressure in the area of the conduit provided for supplying the tooth meshings is higher than in the embodiments in which the pressure for lubrication and cooling of the tooth meshings is increased downstream through a sealing appliance, whereby a disadvantageously large leakage is caused. In addition, the leakage is accompanied by a pressure loss that occurs in the area of the coupling between the torque-proof structural component and the rotating structural component, reducing efficiency in an undesired manner. Here, the larger the volume streams that are to be transferred between such structural components, the higher are the pressure losses.

The present invention is thus based on the objective to provide a device with a torque-proof first structural component and a second structural component that is connected to the first structural component in a rotatable manner at least in certain areas, in which the hydraulic fluid can be transferred to the desired degree with differently high pressures and volume streams between the structural components in a constructionally simple manner, with the device being characterized by failure safety and high efficiency, even if large pressures and volume streams are provided.

This objective is achieved through a device with features as disclosed herein.

In the device according to the invention with a torque-proof first structural component and a second structural component that is connected to the first structural component in a rotatable manner at least in certain areas, the hydraulic fluid can be guided to the lubrication points via the first structural component and the second structural component. An interface between the structural components has a first transition area and a second transition area that is arranged at a distance from the first transition area in axial extension of the structural components. During operation, a pressure is applied to the first transition area that is larger than a pressure that is applied to the second transition area during operation. The transition areas are respectively delimited by areas of the structural components that overlap in the radial direction, conduct hydraulic fluid during operation, are connected to the supply areas for hydraulic fluid of the first structural component as well as with transfer areas for hydraulic fluid of the second structural component, and form the hydraulic fluid conducting area of at least a floating hydrodynamic bearing between the structural components.

According to the invention, a sealing appliance is arranged in the area of the interface in axial extension of the structural components between the first transition area and the second transition area, the sealing appliance being formed with at least one threaded area in the area of a surface of the second structural component or of the second structural component that is facing towards a surface of the second structural component or of the first structural component.

In the device according to the invention, the first transition area is sealed during operation by means of sealing appliance in a constructionally simple way and with a high sealing effect and in a wear-free manner against the second transition area, so that a leakage between the first transition area and the second transition area, and thus also a pressure drop in the area of the interface, is advantageously low and an efficiency of the device is thus correspondingly high. As a smaller pressure gradient is present between the first transition area and the second transition area as compared to a pressure gradient between the first transition area and the environment, the sealing appliance additionally has an advantageously long service life, so that the oil supply is characterized by a low failure probability.

The first transition area as well as the second transition area thus represent a hydraulic fluid ring that is pressurized, wherein the hydraulic fluid ring that is formed by the second transition area has a lower pressure during operation than the hydraulic fluid ring that is formed by the first transition area and, and provides a sealing function for the hydraulic fluid ring formed by the first transition on the side of the first transition area that is facing towards the second transition area.

In the device according to the invention, the second transition area of the interface is sealed against the first transition area of the interface in a con-contact manner by at least one threaded area. Since high rotational speeds of the second structural component support the functional principle of the self-centering hydrodynamic oil connection between the two structural components as well as increase the sealing effect in the threaded area, the device according to the invention is particularly suited for applications in which high rotational speeds occur.

In principle, the embodiment of the device according to the invention is also particularly suited for transferring hydraulic fluid by means of multiple conduits from an area attached at the housing into hydraulic-fluid-conducting areas of a planetary carrier that is arranged in a rotatable manner in a housing area or on the housing area so as to be able to supply different lubrication points from there, such as for example tooth meshings and further lubrication and cooling-intensive areas of a planetary gear, and in particular slide bearing appliances, with hydraulic fluid. The device according to the invention can in particular be used in aircraft gas turbines and ship engines.

In an advantageous embodiment of the device according to the invention, two second transition areas are provided, wherein the second transition areas are arranged in axial extension of the structural components on both sides of the first transition area. In this manner, the high pressure that is present during operation in the area of the first transition area is enclosed on both sides by a low pressure that is present during operation in the area of the second transition areas, so that the first transition area is advantageously decoupled from the environment and an advantageously small pressure difference with a correspondingly good sealing effect is present on both sides of the first transition area.

Preferably, respectively one threaded area is arranged between both second transition areas and the first transition area in the area of the interface, so that the first transition area of the interface is arranged in axial extension of the structural components between at least two threaded areas of the sealing appliance. Here, the threaded areas are respectively characterized by a long service life due to the small pressure difference that is present during operation between the first transition area and the second transition area. Downstream of the interface of the structural components, the second transition areas can be guided together as well as guided separately for conducting hydraulic fluid to loads.

In a further development of the invention, on a side of the second transition area that is facing away from the first transition area with respect to the axial extension of the structural component, a further threaded area of the sealing appliance is arranged by means of which the second transition area can be sealed against the environment of the structural components in a failure-safe and con-contact manner. Here, the second transition area of the interface is arranged in axial extension of the structural component between two threaded areas of the sealing appliance.

If the pitch and the height of thread of the threaded area or the threaded areas increase with a growing distance from the first transition area, the hydraulic fluid is more strongly accelerated in the areas of the threaded area that are facing away from the first transition area, and is recirculated in the direction of the first transition area with a higher velocity due to the varying thread pitch according to the invention and also due to the changed thread depth. At the same time, due to the constructional embodiment of the threaded area that varies depending on the distance from the respective transition area, for a threaded area that is arranged on a side of the respective transition area that is facing the environment, a higher pressure is present in the area of the threaded area that is located close to the respective transition area of the interface, counteracting an inflow of hydraulic fluid from the respective transition area of the interface into an intermediate space between the threaded area of the first structural component or of the second structural component and the associated surface of the second structural component or of the first structural component. In this manner, a flow of hydraulic fluid from the first transition area in the direction of the second transition area or from the second transition area in the direction of the environment of the structural component is avoided in an effective and constructionally simple manner. In contrast, oil is conveyed during operation from the second transition area in the direction of the first transition area via the threaded areas, whereby a sealing effect of the sealing appliance is increased and the first transition area is supplied with hydraulic fluid even if the pressure applied in first transition area is reduced. In addition, in an embodiment in which a second transition area is arranged on both sides of the first transition area, a pressure in the area of the first transition area can be increased by conveying oil from the second transition areas in the direction of the first transition area. In this manner, the failure safety of the system is advantageously increased.

In an embodiment of the device according to the invention that is characterized by a high sealing effect, the threaded area has a multi-start thread.

In a constructionally simple embodiment of a device according to the invention, conduits are provided at the transfer areas of the first transition area and of the second transition area that substantially extend in axial extension of the second structural component in the second structural component, by means of which hydraulic fluid can be conducted to the respective lubrication points.

If the device comprises multiple oil feed areas that are arranged in a symmetrically distributed manner across the circumference of the first structural components in particular for every transition area, the cross sections of the oil feed areas, which are to be guided through the core flow in an application of the device in the area of an aircraft gas turbine, can be embodied with a desired small diameter, whereby a lesser restriction of the flow cross-section of the core flow and thus a smaller blockage of the core flow as well as an increased flow velocity of the oil volume flow rate through the multiple oil feed areas can be obtained. In turn, the increased flow velocity advantageously leads to an improved oil and pressure distribution in the respective hydraulic fluid volume stream and thus enhances the mounting behavior of the floating hydrodynamic bearing of the second structural component at the first structural component as well as the sealing effect of the sealing appliance.

In an embodiment of the device according to the invention that is favorable with respect to the installation space and that is easy to manufacture, the conduits of the first transition area that are connected to the oil feed areas and the conduits of the second transition area that are connected to the oil feed areas are arranged in an alternating manner in the circumferential direction of the second structural component.

The area of the first structural component that delimits the transition areas of the interface is arranged inside the area of the second structural component that codelimits the transition area of the interface, or the area of the second structural component is arranged inside the area of the first structural component, whereby the device according to the invention is embodied so as to be adjusted to the respectively present application case in a simple manner.

In a further advantageous embodiment of the device according to the invention, the hydraulic fluid can be conducted into the second structural component radially from the inside out or from the outside in via the first structural component and the interface.

In an advantageous further development of the device according to the invention, at least one recirculation area that opens into the area of the interface is provided in at least one area of the first structural component and/or of the second structural component that is located close to the further threaded area, connecting the interface to the area of the further threaded area that is facing away from the interface. Via the recirculation area, it is avoided in a simple manner that the pressure acting on the sealing appliance that comprises the further threaded area is reduced, and a wear-free pressure barrier is present close to the primary oil supply passage of the first structural component, via which the second transition area of the interface is sealed. Via the recirculation area, the suctioning-in of fluid from the environment of the structural components in the direction of the second transition area that results from the pressure difference present between the interface and the area of the further threaded area that is facing away from the second transition area of the interface, which is caused by the negative pressure that is created as the hydraulic fluid flows through the interface is avoided in a constructionally simple manner, since, via the recirculation area, hydraulic fluid can be guided from the interface to the area of the further threaded area that is facing away from the second transition area of the interface, and subsequently via the further threaded area back to the second transition area.

In a further development of the device according to the invention that is constructionally simple and can be manufactured with small effort, the recirculation area is embodied as a channel or a bore hole in the first structural component and/or in the second structural component.

If the second structural component is embodied with blade areas that extend substantially in a radial direction, with the transfer areas being provided in between them, hydraulic fluid can be conducted further from the respective transition area of the interface in the direction of the lubrication points by using the rotatory energy of the second structural component.

If the flow cross-sections of the transfer areas are reduced in the flow direction of the hydraulic fluid in the transfer areas starting from the interface in the direction of the lubrication points, the rotatory energy of the second structural component is used to the desired degree for conveying the hydraulic fluid, and a pressure drop in the area of the device is reduced.

If the transfer areas are arranged at a defined angle in the radial direction extending in the second structural component to guide the hydraulic fluid through the transfer areas against the rotational direction of the second structural component in the radial direction, the hydraulic fluid is conducted with high efficiency through the second structural component from the transition area of the interface in the direction of the lubrication points.

In an advantageous embodiment of a device according to the invention, a further sealing appliance is provided that preferably comprises a sealing ring and is arranged on a side of the second transition area that is facing away from the first transition area, and that is in particular arranged at a side of a further threaded area that is facing away from the first transition area. In this manner, in addition to the sealing appliance that provides a robust dynamic sealing function, the second transition area of the interface is sealed against the environment also by means of a static seal.

If the first structural component is supported via bolt elements in oblong holes to avoid any twisting, radial deflections of an engine and relative movements are possible within defined limits, for example. If the bolt elements are arranged at the straight edges of the oblong holes, a bolt-side centering of the first structural component instead of the second structural component is avoided.

In embodiments of the device according to the invention that can be manufactured in a cost-effective manner, the first structural component and the second structural component are manufactured by means of an ALM method or by means of a 3D printing method and/or by means of machine processing methods, wherein complex integrated oil feed appliances can be produced by means of ALM processes or 3D printing methods.

The features specified in the patent claims as well as the features specified in the following exemplary embodiments of the device according to the invention are suitable respectively on their own or in any desired combination with each other for further developing the subject matter according to the invention.

Further advantages and advantageous embodiments of the device according to the invention follow from the patent claims and from the exemplary embodiments that are described in principle in the following by referring to the drawing, wherein, with a view to clarity, the same reference signs are used in the description of the exemplary embodiments for structural components having the same structure and functionality.

Herein:

Figure 1:
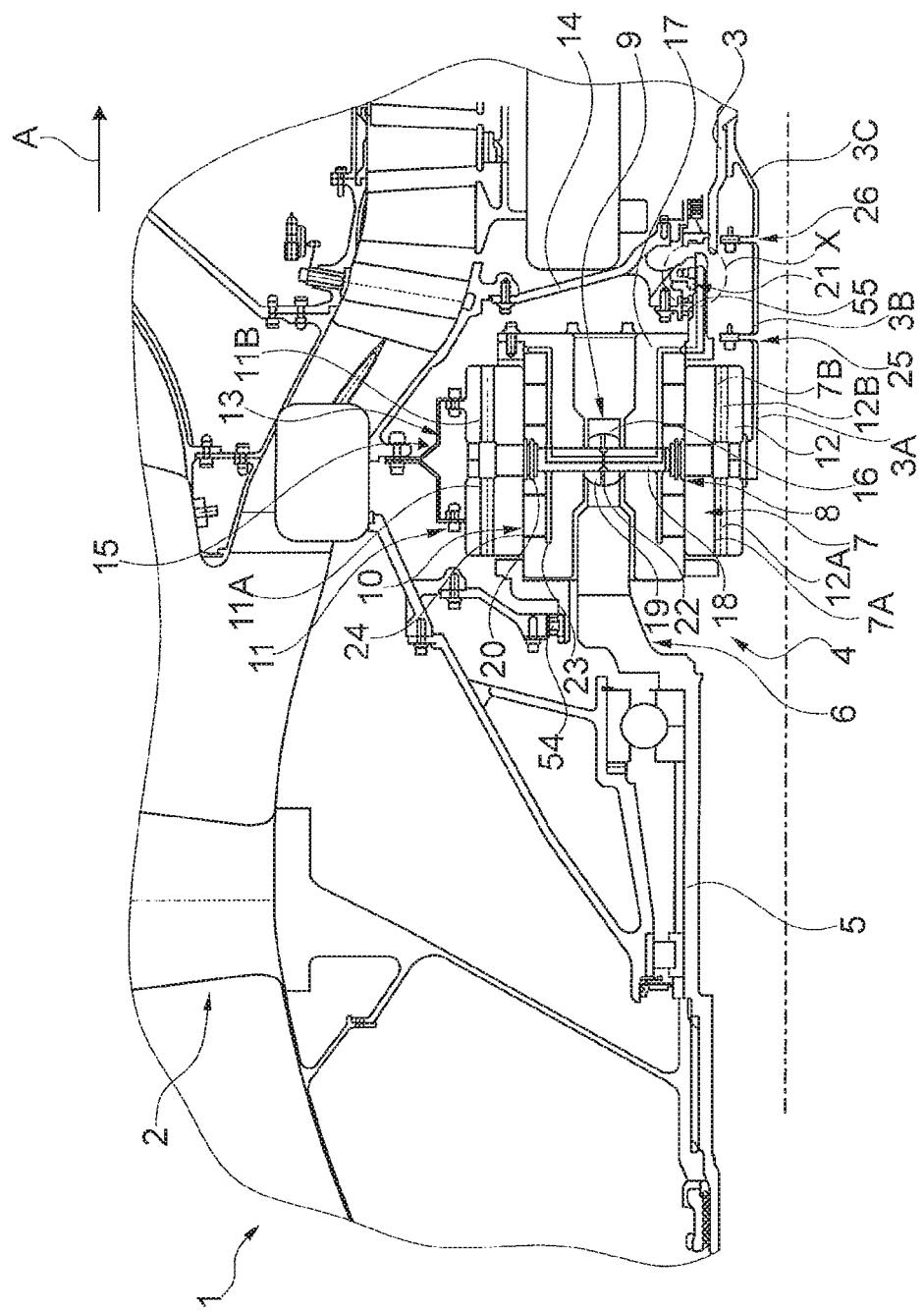
FIG. 1 shows a strongly schematized partial longitudinal section of an aircraft gas turbine with a device according to the invention.

FIG. 1 shows a partial longitudinal section of an aircraft gas turbine 1 that represents a front area of the aircraft gas turbine, which in the present case is embodied as a gas turbine machine. In a rear area, the aircraft gas turbine 1 is embodied with a compressor appliance, which is not shown in any more detail, and in a front area it is embodied with a fan appliance. The fan appliance 2 can be driven by the compressor appliance, wherein, for this purpose, the compressor appliance is connected via an epicyclic gear 4 to a fan shaft 5 in the area of a compressor shaft 3. A planetary web 6 of the epicyclic gear 4 is connected to the planetary wheels 7 via bearing appliances 8 arranged inside planetary wheels 7, which are rotatably arranged in a per se known manner on the planetary web 6.

The bearing appliances 8 respectively comprise a spherical bearing unit 9 for compensating tilting movements between the planetary carrier or the planetary web 6 and the planetary wheels 7, as well as a further bearing unit 10 for rotational decoupling between the planetary carrier 6 and the planetary wheels 7. The planetary carrier 6 is connected to the fan shaft 5 in a torque-proof manner, while a sun wheel 12 of the epicyclic gear 4 is operatively connected to the compressor shaft 3 in a torque-proof manner.

A hollow wheel 11 of the epicyclic gear 4 is supported in a torque-proof manner at the housing side via a flexible connection appliance 13. Movements between the hollow wheel 11 and a housing 14 can be at least approximately compensated for or counterbalanced in the area of the connection appliance 13 in the radial and in the axial direction, so that the tooth meshings in the area between the planetary wheels 7 and the hollow wheel 11 as well as between the planetary wheels 7 and the sun wheel 12 are present to the desired degree in a failure-free manner independently of any movements of the housing as they are caused in the area of the housing 14 by loads acting on the same, and the planetary wheels 7 comb with the hollow wheel 11 as well as with the sun wheel 12 in a manner that is as loss-free and low-wear as possible.

The flexible connection appliance 13 comprises an area 15 that is embodied with an at least approximately u-shaped cross section and that facilitates the desired flexible linking of the hollow wheel 11 to the housing 14 in the axial direction as well as in the radial direction of the aircraft gas turbine 1, and at the same time is embodied to be suitably stiff in the circumferential direction in order to be able to support reaction torques occurring during operation of the aircraft gas turbine 1 in the area of the epicyclic gear 4 via the hollow wheel 11 in the area of the housing 14 to the desired degree.

With finger-like areas 16, the planetary carrier 6 meshes with the planetary wheels 7, wherein, in the present case, the planetary carrier 6 is connected through the finger-like areas 16 to the spherical bearing units 9, and via these is in operatively connected to the inner bearing elements 17 that are also arranged radially inside the planetary wheels 7. Via the further bearing units 10 that are arranged between the planetary wheels 7 and the inner bearing elements 17, the inner bearing elements 17 are connected in a rotatable manner to the planetary wheels 7, substantially representing a part of the planetary carrier 6 and rotating together with the planetary carrier 6. In addition, the planetary carrier 6 is respectively coupled to the inner bearing elements 17 in the area of the finger-like areas 16 via bolt elements 18 that are arranged so as to extend in the radial direction of the epicyclic gear 4. At that, the bolt elements 18 are respectively approximately aligned with the center of the planetary wheels 7 and respectively pass through a coupling element 19 of the spherical bearing units 9 that is respectively arranged in the area of the finger-like areas 16 of the planetary carrier 6 and is embodied in a spherical manner at least in certain areas, whereby the planetary web 6 is also connected to the inner bearing elements 17. In addition, the bolt elements 18 are secured, in the present case via spring rings 20, in the area of the inner bearing elements 17 in the radial direction of the epicyclic gear 4 in the area of the inner bearing elements 17 to ensure the operative connection between the planetary web 6 and the inner bearing elements 17 across the entire operational range of the aircraft gas turbine 1 when the planetary wheels 7 are rotating. In the present case, the further bearing units 10 are embodied as cylindrical roller bearings, in the areas of which radial forces can be transferred to the desired degree between the planetary wheels 7 and the planetary web 6.

The planetary wheels 7, the sun wheel 12 as well as the hollow wheel 11 are respectively embodied with two helical cut tooth areas 7A and 7B, 11A and 11B as well as 12A and 12B that are separated from each other and arranged at a distance to each other in the axial direction. The helix angle of the tooth areas 7A and 7B of the planetary wheels 7, of the tooth areas 11A and 11B of the hollow wheels 11 and the tooth areas 12A and 12B of the sun wheel 12 are embodied in a mirror-inverted manner for minimizing axial meshing forces. This means that the teeth of the tooth areas 7A and 7B as well as the tooth areas 11A and 11B and also the tooth areas 12A and 12B are respectively arranged in a transverse manner, wherein the helix angle respectively has the same value, but is respectively mirror-inverted to the corresponding tooth area of the planetary wheels 7, of the hollow wheels 11 and of the sun wheel 12.

In the present case, the planetary carrier 6 of the epicyclic gear 4 is mounted in the area of two bearing units 54, 55, between which the epicyclic gear 4 is arranged, and in the area of which the loads that act at the planetary carrier 6 are introduced or supported at the housing 14. Since the planetary carrier 6 is embodied with a reduced stiffness in the area of the device 21, the device 21 is provided outside of the area located between the bearing units 54, 55, as shown in FIG. 1.

In order to reduce to a minimum the bending moments that act in the area of the sun wheel 12, in the present case the compressor shaft 3 is embodied so as to be pliable to a predefined extent, so that possibly present eccentricities between the compressor shaft 3 and the sun wheel 12 can be compensated, without creating excessive alignment errors in the area of the spline shaft connection between the compressor shaft 3 and the sun wheel 12. In this manner, it is ensured that the sun wheel 12 takes its desired position during operation. For this purpose, the compressor shaft 3 is divided into multiple areas 3A to 3C that are connected to each other via flange areas 25, 26.

For cooling and lubricating the tooth meshings in the area of the epicyclic gear 4 as well as the bearing appliances of a main load path, which are in particular embodied as slide bearing appliances, with lubricating and cooling oil to the desired degree, hydraulic fluid from the housing 14 is supplied to the areas of the aircraft gas turbine 1 to be cooled and lubricated via separate conduits by means of a device 21 that is arranged in an area of the aircraft gas turbine 1 that is indicated by X, namely in the manner respectively described more closely in the following in connection with FIG. 2 to FIG. 9.

To ensure that the tooth meshings in the area of the epicyclic gear 4 can be supplied with lubricating and cooling oil to the desired degree, hydraulic fluid is introduced from the housing 14 into the inner bearing elements 17, which substantially represent a part of the planetary carrier 6 and rotate together with the planetary carrier 6, via the device 21 that is arranged in the area X of the aircraft gas turbine 1. Subsequently, the hydraulic fluid is conducted further via lubricating and cooling oil conduits 22 that are arranged in the bolt elements 18 in the radial direction of the epicyclic gear 4 from the spherical bearing units 9 into further conduits 23 that substantially extend in the axial direction. From there, the lubricating and cooling oil is in turn conducted further inside additional conduits 24 that extend in the radial direction of the inner bearing elements 17 to the further bearing units 10. At that, the lubricating and cooling oil is also conducted further to the desired extent by means of the rotating planetary wheels 7 in the direction of the tooth meshings between the planetary wheels 7 and the hollow wheel 11 as well as between the planetary wheels 7 and the sun wheel 12 during operation of the aircraft gas turbine 1. The supply of the bearing appliances of the main load path with lubricating and cooling of is not shown in any more detail.

Figure 2:
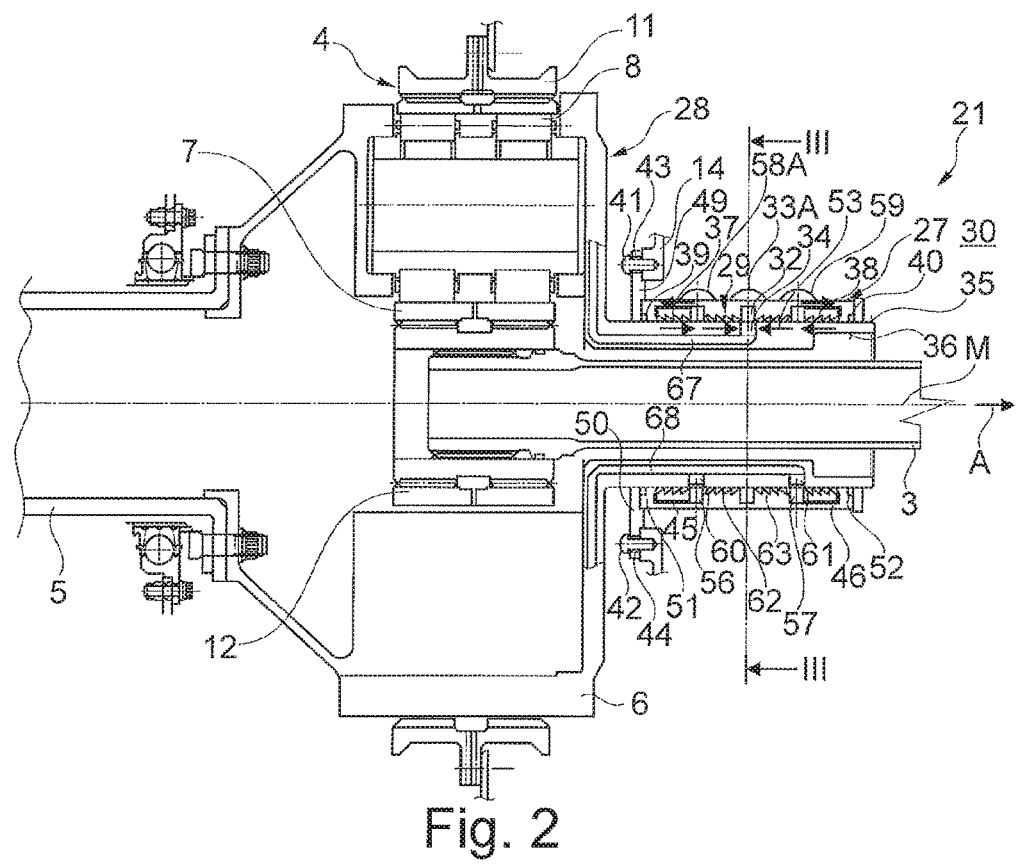
FIG. 2 shows a simplified longitudinal section view of a section of the aircraft gas turbine according to FIG. 1, wherein a first embodiment of the device according to the invention is shown.
Figure 3:
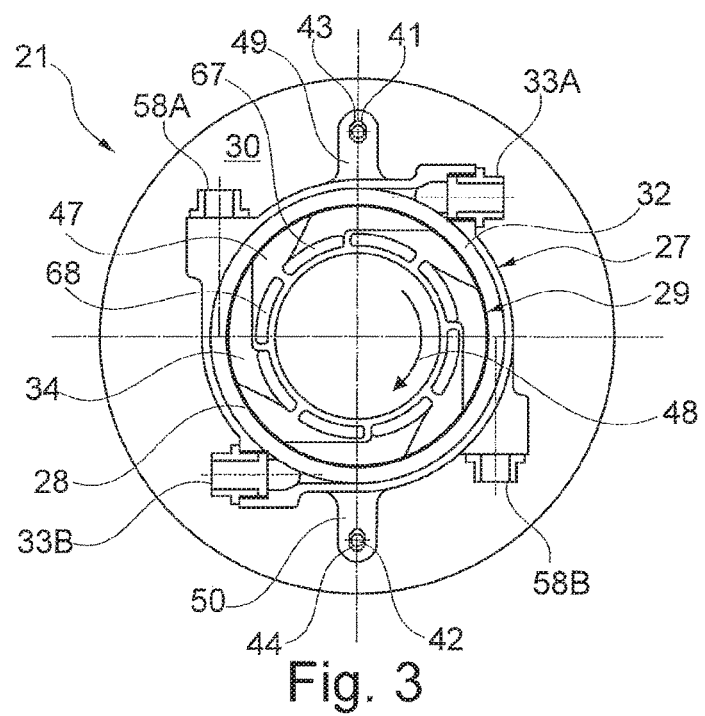
FIG. 3 shows a cross-sectional view of the device according to FIG. 2 along a section plane III-III that is indicated more specifically in FIG. 2.

FIG. 2 and FIG. 3 show a first embodiment of the device 21 with a first structural component 27 that is connected to the housing 14 in a torque-proof manner, and with a second structural component 28 that is connected to the first structural component 27 in a rotatable manner in certain areas, with the a second structural component 28 being in turn connected in a torque-proof manner to the inner bearing elements 17, so that hydraulic fluid can be guided to the lubrication points via the first structural component 27 and the second structural component 28. For this purpose, an interface 29 between the two structural components 27 and 28 is sealed against an environment 30 or an internal space of the aircraft gas turbine 1 by means of a sealing appliance 31, in the manner as it will be described more closely in the following.

The interface 29 comprises a first transition area 32 that is delimited by the areas of the structural components 27 and 28 that overlap in the radial direction and that conducts hydraulic fluid during operation, and that is connected to the first supply areas 33A and 33B of the first structural component 27 as well as to the first transfer areas 34 for hydraulic fluid of the second structural component 28. Further, the interface 29 comprises two second transition areas 56, 57 that are also delimited areas of the structural components 27 and 28 that overlap in the radial direction and conduct hydraulic fluid during operation, wherein a second transition area 56 is arranged on a downstream side with respect to a main flow direction A of the air in the aircraft gas turbine 1, and a second transition area 57 is arranged on an upstream side of the first transition area 32 with respect to the main flow direction A. Like the first transition area 32, the second transition areas 56, 57 are also respectively connected to the second supply areas 58A and 58B or 59 of the first structural component 27, and to the second transfer areas 60 or 61 for hydraulic fluid of the second structural component 28.

During operation, the first transition area 32 is supplied with a higher pressure and a lower volume stream via the supply areas 33A, 33B than the second transition areas 56, 57 is supplied with via the supply areas 58A, 58B or 59, so that the first transition area 32 represents a high-pressure area and the second transition areas 56, 57 represent a low-pressure area. Via conduits 67, which in the present case extend in the axial direction in the second structural component 28 and are connected to the first transfer area 34, hydraulic fluid for lubricating and cooling the gear wheels or tooth meshings 7A, 7B, 11A, 11B, 12A, 12B of the epicyclic gear 4, which require a high oil pressure and a small oil volume flow rate, is conducted during operation. In contrast, hydraulic fluid for lubricating slide bearings, which require a lower oil pressure and a higher oil volume flow rate, is guided via conduits 68 that also extend in the axial direction in the second structural component 28 and are connected to both second transfer areas 60, 61. As can be seen more closely in FIG. 3, in the present case respectively four conduits 67 of the high-pressure area and four conduits 68 of the low-pressure area are provided in the circumferential direction of the structural components 27, 28, wherein respectively one conduit 67 is enclosed by two conduits 68 and in reverse, and the conduits 67 and 68 are thus arranged in an alternating manner in the circumferential direction of the structural components 27, 28.

The transition areas 32, 56, 57 form the oil-conducting or hydraulic-fluid-conducting area of a floating hydrodynamic bearing between the structural components 27 and 28, via which the structural component 28 is mounted in a substantially non-contact and wear-free manner at the structural component 27 that is embodied in a torque-proof manner. In the present case, two supply areas 33A, 33B, 58A, 58B, 59 are assigned to each transition area 32, 56, 57, wherein also three, four or more supply areas per transition area 32, 56, 57 can be provided. In the present case, the respective supply areas 33A, 33B, 58A, 58B, 59 of a transition area 32, 56, 57 are formed as flexible tubes and are arranged so as to be respectively symmetrically distributed across the circumference of the first structural component 27 and of the second structural component 28 to create a pressure profile across the circumference of the structural components 27 and 28. This is advantageous, as then the second structural component 28 is mounted in the radial direction in the first structural component 27 via a hydrodynamic bearing. However, in this area there is substantially no load-bearing hydrodynamic slide bearing in the actual sense. Via the floating bearing of the second structural component, good sealing without mechanical contact is achieved.

In the area of a surface 36 that is facing the surface 35 of the second structural component 28, the sealing appliance 31 is embodied with threaded areas 62, 63 and further threaded areas 37, 38. The threaded areas 62, 63 are arranged in axial extension of the structural components 27, 28 between the first transition area 32 and the second transition area 56 or the second transition area 57, whereas the further threaded areas 37, 38 are arranged on a side of the second transition area 56 or of the second transition area 57 that is facing away from the first transition area 32.

The first transition area 32 is sealed against the second transition areas 56, 57 by means of the threaded areas 62, 63, whereas the second transition areas 56, 57 are sealed in the axial direction against the environment 30 by means of the further threaded areas 37, 38. Here, the threaded areas 37, 38, 62, 63 provide a robust dynamic sealing function. The sealing function of the sealing appliance 31 against an environment is given also in the case that the static sealing appliances 39 and 40 fail. The static sealing appliances 39 and 40 are respectively provided on the sides of the second transition areas 56 or 57 that are facing away from the first transition area 32 or in the area of ends of the first structural component 27 or the threaded areas 37 and 38, and only represent so-called backup seals when the sealing appliance 31 provides the sealing. Further, the further sealing appliances 39 and 40 are supported in grooves 51, 52 of the first structural component 27 in the axial direction by disc elements 49 and 50.

The device 21 creates a floating oil coupling between the first structural component 27 and the second structural component 28 to introduce hydraulic fluid from a static or non-rotatable area or the first structural component 27 into a rotating area to the desired degree, i.e. in the present case into the rotatable structural component 28. At that, the first structural component 27 is affixed in a torque-proof manner in the area of the housing 14 via multiple bolt elements 41, 42, wherein the bolt elements 41, 42 are arranged in oblong holes 43, 44 to facilitate housing deflections of the aircraft gas turbine 1, and also relative movements between the housing 14 and the first structural component 27 as well as the second structural component 28. In addition, the bolt elements 41 and 42 arranged so as to adjoin the straight edges of the oblong holes 43 and 44 in the circumferential direction of the structural components 27 and 28. In this manner, a bolt-side centering of the static oil supply coupling body or of the first structural component 27 instead of the support shaft or of the second structural component 28 is avoided.

In the present case, the radial distances between the static coupling and the rotating areas or between the surfaces 35 and 36 of the structural components 27 and 28 are reduced to an absolute minimum from the production technology perspective to minimize the draining off oil in the area of the interface 29 of the structural components 27, 28 in the axial direction between the first transition area 32 and the second transition areas 56, 57 and between the second transition areas 56, 57 and the environment, and to achieve the sealing effect of the sealing appliance 31 to the desired degree. In addition, the substantially non-contact sealing appliance 31 is characterized by a low wear despite the small clearances. The hydrodynamic self-centering that is present between the structural components 27 and 28 facilitates a floating static housing that forms a particularly advantageous wear-free arrangement without metal-to-metal contact together with the rotating structural component 28.

In the present case, the threaded areas 62, 63 and the further threaded areas 37, 38 are respectively embodied with single-start threads and can also comprise multi-start thread. In the present case, the threaded areas 37, 38, 62, 63 respectively are embodied with a higher thread pitch and with a greater thread depth at their ends that are facing away from the first transition area 32 than in the areas that are facing towards the first transition area 32. Due to the fact that the thread pitch as well as the thread depth decrease with a growing distance to the first transition area 32, the oil in the outer areas of the threaded areas 37, 38, 62, 63 that are facing away from the first transition area 32 is more strongly accelerated and recirculated with a higher velocity from the threaded areas 62, 63 in the direction of the first transition area 32 and from the further threaded areas 37, 38 in the direction of the second transition areas 56, 57. In contrast, a higher fluid pressure is present in the areas of the threaded areas 37, 38, 62, 63 that are close to the first transition area 32 or the second transition areas 56, 57, counteracting an inflow of hydraulic fluid from the first transition area 32 into the intermediate space between the threaded areas 62, 63 and the second structural component 28, or an inflow of hydraulic fluid from the second transition areas 56, 57 into the intermediate space between the further threaded areas 37, 38 and the second structural component 28. In this manner, a flow of hydraulic fluid from the first transition area 32 and a flow of hydraulic fluid from the second transition area 32 counter to the flow direction of the hydraulic fluid as indicated by the arrow 53 is avoided in an effective and simple manner.

By means of the proposed arrangement of the first transition area 32 in the axial direction between the second transition areas 56, 57, a leakage of hydraulic fluid through the interface 29 in the axial direction to the environment 30 can be avoided even in the case that hydraulic fluid is guided counter to the arrow direction 53 from the first transition area 32 in the direction of the second transition areas 56, 57 during operation. This is due to the fact that in the described case hydraulic fluid is supplied to the second transition areas 56, 57 and is discharged via the conduits 68 in the direction of the lubrication points. In addition, the pressure that is present in the area of the second transition areas 56, 57 represents a pressure barrier for the first transition area 32, wherein hydraulic fluid is conveyed from the second transition areas 56, 57 in the direction of the first transition area 32, and thus supports a sealing effect between the first transition area 32 and the second transition areas 56, 57. In addition, the sealing appliance 31 is characterized by a long service life, as during operation only a small pressure difference is present between the pressure in the area of the first transition areas 32 and a pressure present during operation in the area of the second transition areas 56, 57, wherein in addition this pressure difference is smaller than a pressure difference between the pressure that is present during operation in the area of the first transition areas 32 and an ambient pressure.

During operation, the pressure that acts from the sides of the first transition area 32 on the second transition areas 56, 57 is reduced through the threaded areas 62, 63, and thus a high-pressure barrier is created close to the supply areas 33A and 33B, forming a dynamic seal providing a strong sealing effect.

Since the hydraulic fluid that flows in via the supply areas 33A, 33B into the second transition areas 56, 57 and from there is drained in the direction of the second transfer areas 60, 61 of the second structural component 28 creates an negative pressure in the area between the further threaded areas 37 and 38 and the second structural component 28, and a suctioning-in of air via the sealing appliance 31 from the environment 30 in the direction of the second transition areas 56, 57 is to be avoided, recirculation areas 45, 46 that open into the area of the interface 29 are provided in the areas of the first structural component 27 that are close to the further threaded areas 37 and 38, connecting the transition area 32 to the areas of the further threaded areas 37 and 38 that are facing away from the interface 29. The hydraulic fluid that is supplied under pressure via the supply areas 33A, 33B partly flows via the recirculation areas 45 and 46 from the interface 29 in the direction of the ends of the further threaded areas 37 and 38 that are facing away from the interface 29 in the axial direction.

This means that hydraulic fluid flows from the interface 29 via the recirculation areas 45 and 46 into areas of the first structural component 27 that are arranged between the further threaded areas 37 and 38 and the further sealing appliances 39 and 40. Due to the negative pressure, this hydraulic fluid is then recirculated in the form of a circulating flow that is caused by the hydraulic fluid flowing through the second transition areas 56, 57 from the interface 29 via the recirculation areas 45 and 46 and via the further threaded areas 37 and 38 back into the respective second transition area 56, 57. In this manner, a suctioning-in of air via the further sealing appliances 39 and 40 and the further threaded areas 37 and 38 from the environment 30 is avoided in a constructionally simple manner.

Via the further threaded areas 37 and 38 as well as the recirculation areas 45 and 46, the pressure acting on the sealing appliance 31 and also the pressure acting on the further sealing appliances 39 and 40 is reduced, and additionally a pressure barrier close to the supply areas 58A, 58B or 59 is created, forming a dynamic seal that provides a high sealing effect. In this manner, the failure probability is reduced and the service life of the further sealing appliances 39 and 40 comprising the sealing rings is prolonged.

Depending on the respectively present application case, the recirculation areas 45 and 46 can be arranged either in the first structural component 27 or in the second structural component 28, wherein respectively that arrangement is selected by means of which the respectively better recirculation pressure is achieved.

Depending on the respectively present application case, the device 21 is embodied with one or with multiple recirculation areas 45 and 46 that are arranged in a manner distributed across the circumference of the structural components 27 and 28 to avoid the previously mentioned suctioning-in of air from the environment across the entire circumference of the structural components 27 and 28 in an effective manner.

Via the recirculation areas 45 and 46, hydraulic fluid is guided via the further threaded areas 37 and 38 in the direction of the second transition areas 56, 57, and additionally a positive pressure is created in the area of the further sealing appliances 39 and 40, so that the suctioning-in of air from the environment 30 via the further sealing appliances 39 and 40 and also the further threaded areas 37 and 38 is avoided with small effort.

The first transfer areas 34 of the second structural component 28 are arranged between blade areas 47 that substantially extend in the radial direction in the manner shown in FIG. 3, or are respectively delimited by two blade areas 47. The blade areas 47 are integrated in the second structural component 28 or connected to the same and are embodied so as to extend in a manner oriented radially outward in an angled manner with respect to the purely radial extension of the second structural component 28 in the rotational direction 48 of the second structural component 28. Due to the angled arrangement of the blade areas 47, the flow cross-sections of the first transfer areas 34 narrow to the shown extent in the flow direction of the hydraulic fluid in the first transfer areas 34 starting from the interface 29 in the direction of the lubrication points of the epicyclic gear 4.

The hydraulic fluid that is supplied via the supply areas 33A and 33B under pressure is introduced counter to the rotational direction 48 of the second structural component 28 with a high relative velocity with respect to the blade areas 47 from the interface 29 or its first transition area 32 into the first transfer areas 34. The high relative velocity between the hydraulic fluid and the blade areas 47, which among other things is a function of the operational state of the supply stream, and the opposite rotational direction 48 of the second structural component 28 as well as the angle of attack and the orientation of the blade areas 47 facilitate that the hydraulic fluid is guided through the structural component 28 radially inward to the conduits 67 and is pressurized in the first transfer areas 34 in the exemplary embodiment of the device 21 shown in FIG. 2 and FIG. 3. The number of the blade areas 47 of the second structural component 28 can be selected in correspondence with the torsional behavior of the epicyclic gear 4.

In addition to the previously mentioned advantages that can be achieved by the multiple supply areas 33A and 33B that are arranged in a manner distributed across the circumference of the structural components 27 and 28, the diameters of the supply areas 33A and 33B can be dimensioned to be smaller as compared to when a single supply area is provided, without thus limiting the total volume flow rate. Supply lines with a smaller diameter that are guided in guide blades through the core flow of the aircraft gas turbine 1 limit the cross section of the core flow to a smaller extent. In addition, hydraulic fluid is introduced with a higher flow velocity into the interface 29 in the smaller flow cross-sections of the supply areas 33A, 33B, whereby in turn an improved oil and pressure distribution is obtained in the volume stream which is introduced into the first transfer areas 34 counter to the rotational direction of the second structural component 28.

Associated with the second transition areas 56, 57 are blade areas that are embodied in a comparative manner to the blade areas 47 of the first transition area 32 and are not shown in the Figures in any more detail, wherein the blade areas of the second transition areas 32 are arranged so as to be twisted with respect to the arrangement of the blade areas 47 in FIG. 3 by approximately 45° with respect to a central axis M of the structural components 27, 28. The transfer areas 60, 61 that are arranged between the blade areas open into the conduits 68.

Due to the velocity difference that is obtained by means of the blade areas 47, a desirably high supply pressure for supplying the respective lubrication points is respectively achieved downstream of the device 21, wherein through the additive energy that is made available through the rotation of the second structural component 28, an undesired pressure drop in the area of the device 21 is avoided without additional effort. The shape as well as the number of the supply areas 33A, 33B, 58A, 58B, 59 are designed or defined in such a manner that the hydraulic fluid is transferred with a high efficiency in the respective transfer path of the hydraulic fluids due to the pressure and the flow velocity that is respectively present there. Further, also the supply areas 33A, 33B, 58A, 58B, 59 and the blade areas 47 are matched to each other to achieve a maximum increase in pressure of the respective transfer path and to be able to guide a maximum oil volume flow rate through the device 21.

In principle, there is the possibility of manufacturing structural components 27 and 28 by means of a so-called ALM method (additive layer manufacturing) or by means of a 3D printing method or to manufacture the structural components 27 and 28 by means of machine processing methods that comprise the supply areas 33A, 33B, 58A, 58B, 59, wherein complex integrated oil feed appliances can be manufactured by means of ALM processes.

Figure 4:
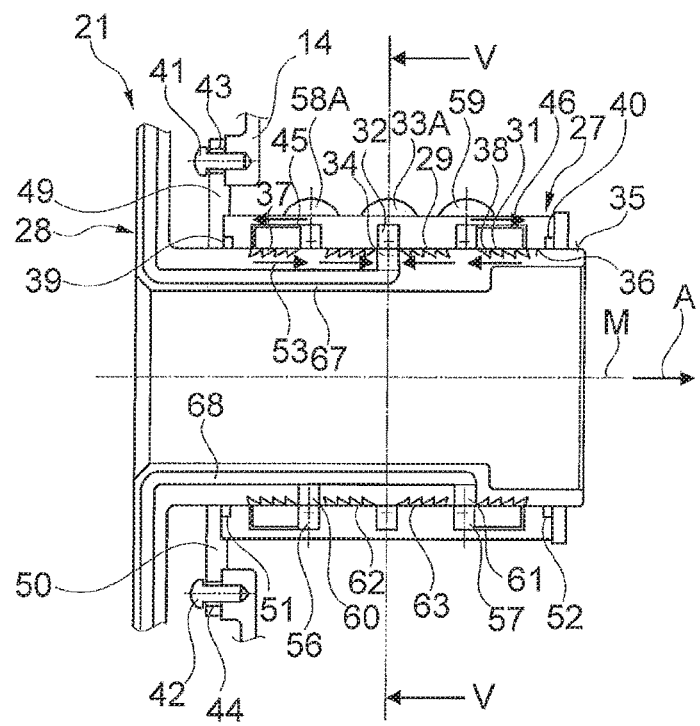
FIG. 4 shows a simplified longitudinal section view of a second embodiment of the device according to the invention.
Figure 5:
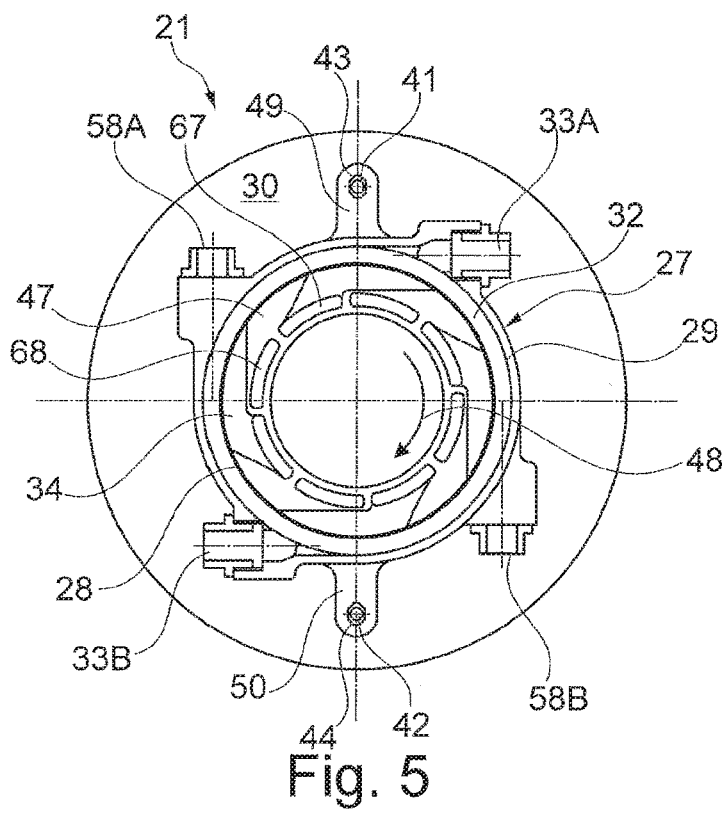
FIG. 5 shows a cross-sectional view of the device according to FIG. 4 along a section plane V-V that is indicated more specifically in in FIG. 4.

FIG. 4 and FIG. 5 show a second exemplary embodiment of the device 21, which substantially corresponds to the first embodiment of the device 21 shown in FIG. 2 and FIG. 3, which is why in the following description only the differences between the two embodiments of the device 21 are more closely discussed, and the above description regarding FIG. 2 and FIG. 3 is referred to when it comes to the further functionality of the device 21 according to FIG. 4 and FIG. 5. The same applies to the third exemplary embodiment of the device 21 shown in FIG. 6 and FIG. 7 and the fourth exemplary embodiment of the device 21 shown in FIG. 8 and FIG. 9.

In the device 21 according to FIG. 4 and FIG. 5, the threaded areas 62 and 63 as well as the further threaded areas 37 and 38 are arranged in the area of the surface 35 of the second structural component 28 to seal the first transition area 32 of the interface 29 to the previously described extent against the second transition areas 56 and 57 and the second transition areas 56 and 57 against the environment 30 of the structural components 27 and 28, while the recirculation areas 45 and 46 are provided so as to extend in in the area of the first structural component 27 to the extent that is explained in more detail in the above description.

Figure 6:
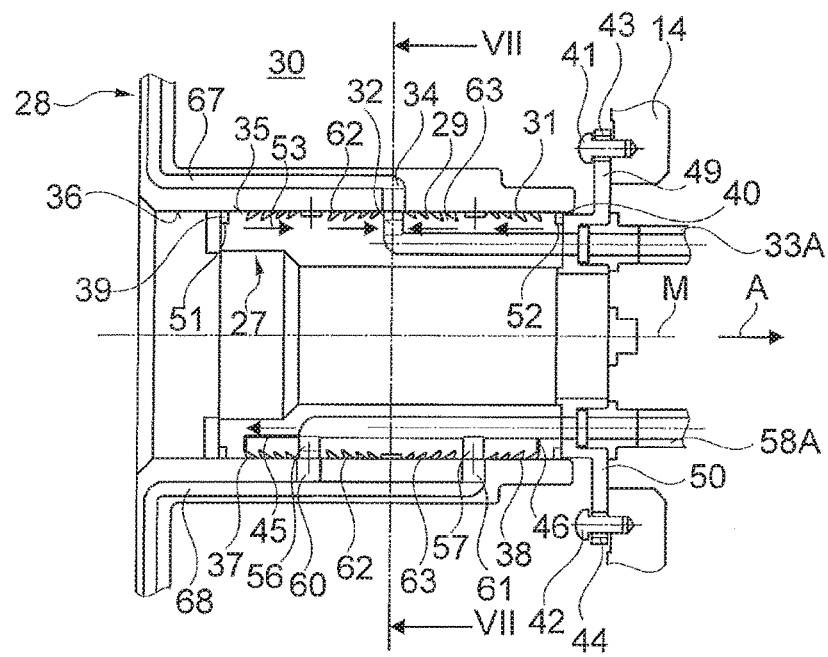
FIG. 6 shows a simplified longitudinal section view of a third embodiment of the device according to the invention.
Figure 7:
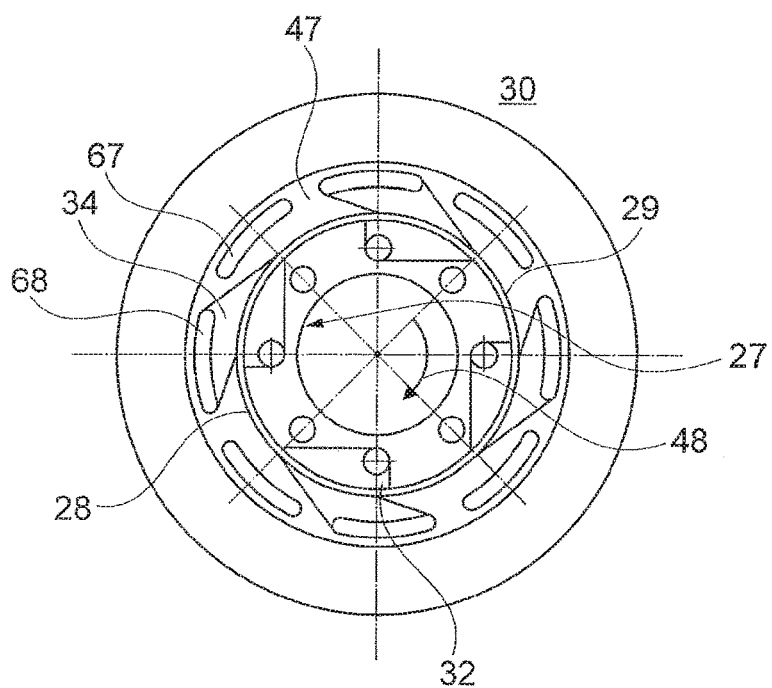
FIG. 7 shows a cross-sectional view of the device according to FIG. 6 along a section plane VII-VII that is indicated more specifically in FIG. 6.

In the third exemplary embodiment of the device 21 according to FIG. 6 and FIG. 7, the first structural component 27 is arranged radially inside the second structural component 28, whereby the hydraulic fluid that is introduced via the supply areas 33A, 58A of the interface 29 is supplied from the inside via the interface 29 radially outward into the first transfer areas 34 or the second transfer areas 60, 61 of the second structural component 28. Again, multiple first supply areas 33A and 58A that are arranged so as to be distributed across the circumference can be provided, wherein the embodiments according to FIG. 2 to FIG. 5 are referred to in this context. The threaded areas 37, 38, 62, 63 are again 3 provided in the area of the second structural component 28, like in the first embodiment of the device 21 according to FIG. 2 and FIG.

Figure 8:
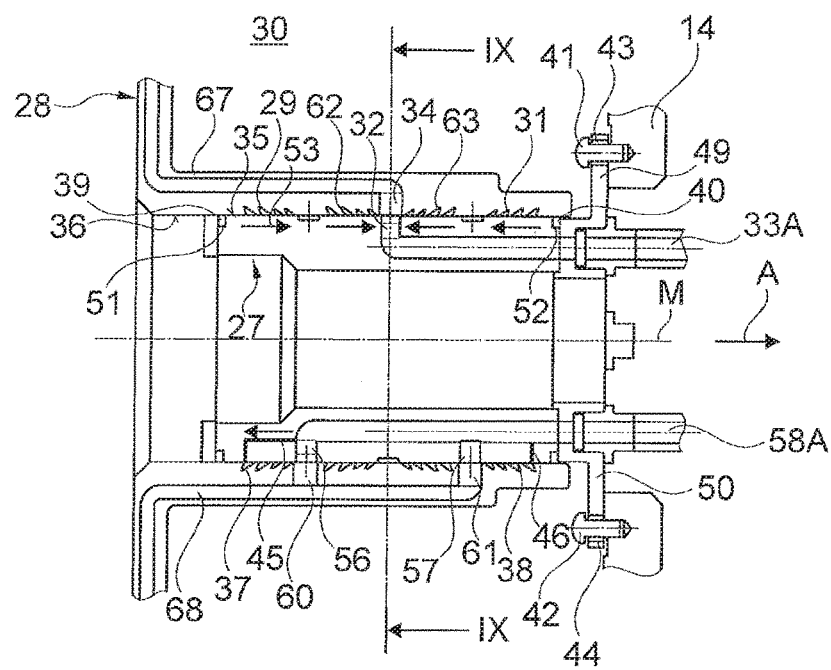
FIG. 8 shows a simplified longitudinal section view of a fourth embodiment of the device according to the invention.
Figure 9:
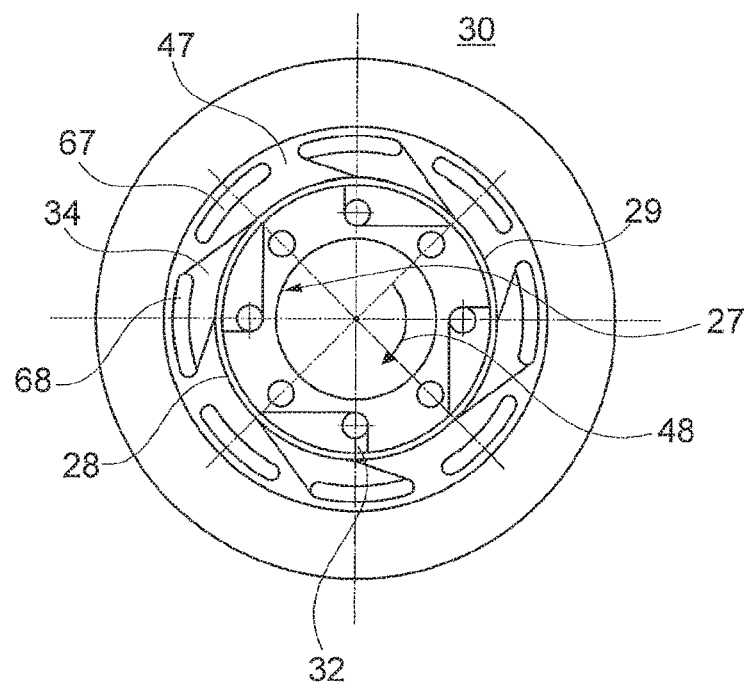
FIG. 9 shows a cross-sectional view of the device according to FIG. 8 along a section plane IX-IX that is indicated more specifically in FIG. 8.

In the fourth exemplary embodiment of the device 21 shown in FIG. 8 and FIG. 9, which substantially corresponds to the first embodiment of the device 21 shown in FIG. 6 and FIG. 7, the threaded areas 37, 38, 62, 63 are arranged in the area of the first structural component 27, in contrast to the embodiment according to FIG. 6 and FIG. 7.

PARTS LIST 1 aircraft gas turbine
2 fan appliance
3 compressor shaft
3A to 3C area of the compressor shaft
4 epicyclic gear
5 fan shaft
6 planetary web, planetary carrier
7 planetary wheel
7A, B tooth area of the planetary wheel
8 bearing appliance
9 spherical bearing unit
10 further bearing unit
11 hollow wheel
11A, B tooth area of the hollow wheel
12 sun wheel
12A, B tooth area of the sun wheel
13 flexible connection appliance
14 housing
15 u-shaped area of the flexible connection appliance
16 finger-like area of the planetary web
17 inner bearing element
18 bolt element
19 spherical coupling element
20 spring ring
21 device
22 lubricating and cooling oil conduit
23 further conduit
24 additional conduit
25, 26 flange area
27 first structural component
28 second structural component
29 interface
30 environment
31 sealing appliance
32 first transition area
33A, 33B first supply area
34 first transfer area
35 surface of the second structural component
36 surface of the first structural component
37, 38 further threaded area
39, 40 further sealing appliance
41, 42 bolt element
43, 44 oblong hole
45, 46 recirculation area
47 blade area
48 rotational direction
49, 50 disc element
51, 52 groove
53 flow direction
54, 55 bearing unit
56, 57 second transition area
58A, 58B, 59 second supply area
60, 61 second transfer area
62,63 threaded area
67, 68 conduit
A main flow direction
M central axis

The invention claimed is:

1. A device comprising:
a torque-proof first structural component and a second structural component connected to the first structural component in a rotatable manner, at least in certain areas,
a source of hydraulic fluid conducted to lubrication points via the first structural component and the second structural component,
an interface between the first and second structural components and having a first transition area and a second transition area arranged at a distance to the first transition area in an axial extension of the first and second structural components,
a first source of pressure applied to the first transition area during operation that is higher than a second source of pressure applied to the second transition area during operation,
the first and second transition areas being respectively delimited by areas of the first and second structural components that overlap in a radial direction, conduct hydraulic fluid during operation, are connected with supply areas for the hydraulic fluid of the first structural component as well as with transfer areas for the hydraulic fluid of the second structural component, and form a hydraulic fluid conducting area of a floating hydrodynamic bearing between the first and second structural components, and
a sealing appliance arranged in an area of the interface in the axial extension of the first and second structural components between the first transition area and the second transition area, the sealing appliance being formed with a threaded area in an area of a surface of the second structural component or of the first structural component that is facing towards the surface of the first structural component or of the second structural component.

2. The device according to claim 1, and further comprising two of the second transition areas arranged in the axial extension of the first and second structural components on both sides of the first transition area.

3. The device according to claim 1, and further comprising a further threaded area of the sealing appliance arranged on a side of the second transition area that faces away from the first transition area.

4. The device according to claim 1, wherein a pitch and a height of a thread of the threaded area increases with a growing distance from the first transition area.

5. The device according to claim 1, wherein the threaded area has a multi-start thread.

6. The device according to claim 1, and further comprising conduits that extend in the second structural component positioned at the transfer areas of the first transition area and of the second transition area in the axial extension of the second structural component.

7. The device according to claim 6, and further comprising a plurality of oil feed areas arranged in a manner distributed around a circumference of the first structural component and associated with each of the first and second transition areas.

8. The device according to claim 7, wherein the conduits of the first transition area that are connected to the oil feed areas and the conduits of the second transition area that are connected to the oil feed areas are arranged in a manner alternating in a circumferential direction of the second structural component.

9. The device according to claim 1, wherein an area of the first structural component that delimits the first and second transition areas of the interface is arranged inside an area of the second structural component that co-delimits the first and second transition areas of the interface, or the area of the second structural component is arranged inside the area of the first structural component.

10. The device according to claim 1, wherein the hydraulic fluid is guided via the first structural component and the interface into the second structural component radially from inside out or from outside in.

11. The device according to claim 3, and further comprising a recirculation area positioned in at least one area chosen from the first structural component and the second structural component that is located close to the further threaded area, the recirculation area opening into an area of the interface and connecting the interface to the area of the further threaded area that faces away from the interface.

12. The device according to claim 1, wherein the second structural component includes blade areas that extend in the radial direction, with the first and second transfer areas being positioned between the blade areas.

13. The device according to claim 1, wherein flow cross-sections of the transfer areas decrease in a flow direction of the hydraulic fluid in the transfer areas from the interface in a direction of the lubrication points.

14. The device according to claim 1, wherein the transfer areas are arranged to extend in the second structural component at a defined angle in the radial direction to conduct the hydraulic fluid through the transfer areas in the radial direction counter to a rotational direction of the second structural component.

15. The device according to claim 1, and further comprising a further sealing appliance that comprises a sealing ring on a side of a further threaded area that faces away from the first transition area.

* * * * *